(12) United States Patent
Forster (10) Patent No.: US 6,744,367 B1
(45) Date of Patent: Jun. 1, 2004

(54) IDENTIFICATION TAG

(75) Inventor: Ian Forster, Chelmsford (GB)

(73) Assignee: Marconi Data Systems Limited, Hatfield (GB)

( * ) Notice: Subject to any disclaimer, the term of this patent is extended or adjusted under 35 U.S.C. 154(b) by 0 days.

(21) Appl. No.: 09/979,191

(22) PCT Filed: May 15, 2000

(86) PCT No.: PCT/GB00/01878

§ 371 (c)(1),
(2), (4) Date: Mar. 12, 2002

(87) PCT Pub. No.: WO00/72255

PCT Pub. Date: Nov. 30, 2000

(30) Foreign Application Priority Data

May 22, 1999 (GB) ............................................. 9911878

(51) Int. Cl.⁷ ............................................. G08B 13/14
(52) U.S. Cl. ................. 340/572.7; 340/5.8; 340/572.4; 340/870.02; 340/870.18; 310/313 R; 310/322; 310/367
(58) Field of Search .......................... 340/572.7, 572.4, 340/572.5, 5.8, 870.18, 870.02; 310/367, 313 R, 181, 322; 235/492

(56) References Cited

U.S. PATENT DOCUMENTS

| | | | | |
|---|---|---|---|---|
| 4,209,783 A | | 6/1980 | Ohyama et al. | |
| 4,484,476 A | * | 11/1984 | Nagasaki | ...................... 73/606 |
| 4,672,338 A | * | 6/1987 | Faber | ......................... 333/151 |
| 4,676,104 A | * | 6/1987 | Cullen | ...................... 73/516 R |
| 4,951,057 A | * | 8/1990 | Nagel | ........................... 342/51 |
| 4,980,680 A | * | 12/1990 | Knoll et al. | ........... 340/825.31 |
| 5,469,170 A | | 11/1995 | Mariani | |
| 5,517,195 A | | 5/1996 | Narlow et al. | |
| 5,734,332 A | | 3/1998 | Kirknes | |
| 6,060,815 A | * | 5/2000 | Nysen | ......................... 310/318 |
| 6,104,311 A | * | 8/2000 | Lastinger | ............... 340/825.54 |
| 6,330,939 B1 | * | 12/2001 | Pratt | ........................... 194/206 |

FOREIGN PATENT DOCUMENTS

| | | |
|---|---|---|
| EP | 0 142 380 A2 | 5/1985 |
| EP | 0 413 634 A2 | 2/1991 |
| GB | 1 433 140 | 4/1976 |
| GB | 1 534 750 | 12/1978 |
| GB | 2 139 956 A | 11/1984 |
| GB | 2 306 080 A | 4/1997 |

* cited by examiner

*Primary Examiner*—Daniel J. Wu
*Assistant Examiner*—Son Tang
(74) *Attorney, Agent, or Firm*—Kirschstein, et al.

(57) ABSTRACT

An identification tag is provided comprising a multilayer assembly incorporating, in sequence, a metal backing layer, a bulk structural layer, a piezo-electric layer and an electrode layer. The electrode layer incorporates antennas structures for receiving interrogating radiation comprising a first radiation component at a relatively lower frequency and a second radiation component at a relatively higher frequency. The electrode layer also incorporates a structure for modulating a second signal generated in response to receiving the second component by a first signal generated in response to receiving the first component to generate a modulated signal which is re-emitted as reflected radiation from the tag. The presence of the tag is determinable from modulation components present in the reflected radiation, thereby distinguishing the tag from other objects capable of reflecting radiation, but not modulating it.

22 Claims, 4 Drawing Sheets

IDENTIFICATION TAG

The present invention relates to an identification tag, in particular but not exclusively to an identification tag which is responsive to interrogation using radio wave radiation.

Identification tags are conventionally in the order of a few cm's in size and are used in a number of applications, for example personnel wearable tags and anti-theft tags. Such anti-theft tags are often designed to be interrogated by radio radiation, for example using radio wave radiation having a frequency of several hundred kilohertz; the tags are conventionally attached to items of merchandise in retailing premises so that unauthorised passage of the tags past associated interrogating apparatus triggers an alarm.

Personnel wearable tags are often worn by authorised personnel and are used to provide selective access to facilities, for example equipment and buildings. The personnel tags are frequently in the form of magnetic swipe cards which are interrogated by swiping them physically past magnetic sensors.

Antitheft tags are described in a UK patent application no, GB 2306080A, the tags utilising field effect transistor (FET) technology for mixing interrogating radiation at frequencies of $f_1$ and $f_2$ and thereby generating corresponding mixed radiation at frequencies of $f_1+Af_2$ for use in detecting presence of the tags.

Moreover, marker tags for use in surveillance systems are described in a European patent application no. EP 0 142 380 A2. The marker tags each comprise a passive distributed resonant inductor-capacitor circuit exhibiting two electrical resonances, the resonances being detectable for determining presence of the tags.

Furthermore, an identification device is described in a U.S. Pat. No. 5,734,332. The device includes an inactive code carrier, for example a standing acoustic wave component, a frequency mixing section and a double antenna input. The device is operable to receive interrogating radiation at two different frequencies and generate two corresponding received signals. The signals are mixed in the frequency mixing section to generate an intermediate signal having a frequency corresponding to a difference in frequency between the received signals. The intermediate signal is coupled to the acoustic wave device which applies a coded modulation to the intermediate signal. The modulated intermediate signal is then recombined with the received signals to provide a composite signal for emission from the device. Emitted radiation corresponding to the composite signal is detected by equipment interrogating the device, thereby establish presence and identity of the device.

Conventional identification tags suffer from one or more of the following problems:

(a) they do not provide a sufficiently unique response in some applications; this can result in unauthorised personnel gaining access to buildings and equipment;

(b) in anti-theft applications, interrogation equipment associated with the tags are triggered spuriously by objects providing a similar response to that provided by the tags; and (c) it is sometimes difficult to uniquely identify tags adapted to be interrogated by non-contact interrogation methods, for example using radio wave radiation; and (d) it is not straightforward to modify identification codes recorded on the tags, for example where the identification tags are affixed to items of merchandise as they proceed through their manufacturing processes, the tags being used for recordal of completed manufacturing processes applied to the items or for quality control purposes.

There is thus a problem of providing each card with an associated unique signature whilst also making it susceptible to non-contact interrogation methods and unsusceptible to counterfeiting.

The inventor has appreciated that it is desirable to improve the reliability of conventional identification tags and associated interrogation equipment by arranging for the equipment to emit a specific form of interrogating radiation and for the tags to be selectively responsive to the radiation. Moreover, the inventor has appreciated that it would be desirable to improve the conventional tags so that information can be recorded on them more easily.

Therefore, according to the present invention, there is provided an identification tag comprising:

(a) transponding means for receiving interrogating radiation and for emitting modulated radiation in response; and (b) modulating means for modulating the received interrogating radiation in a manner indicative of tag identity to generate tile modulated radiation, the transponding means including first and second structures for receiving first and second radiation components of the interrogating radiation and generating corresponding first and second signals respectively, said first and second components being at mutually different frequencies, the modulating means including a coupling structure operative to receive the second signal and generate corresponding acoustic radiation and to couple the acoustic radiation to the first structure, the acoustic radiation modulating the first signal in the first structure to generate the modulated radiation, the coupling structure comprising a piezo-electric film for generating the acoustic radiation in response to the second signal.

The invention provides at least one of the following advantages:

(a) the tag is capable of being more reliably identified by a manner in which the modulated radiation is modulated; and (b) the tag is capable of having its identification characteristics modified by altering the first structure.

In many applications for identification tags, small tag size and low tag cost arm important criteria. Preferably, the coupling structure incorporates a piezo-electric film for generating the acoustic radiation in response to the second signal. This provides the advantage of being a potentially cheap and compact manner to implement the coupling structure.

Acoustic radiation is defined as being mechanical vibrational radiation propagating within a medium.

Advantageously, the film can be of polyvinyl difluoride (PVDF) material which provides a benefit of being mechanically robust.

Conveniently, the tag is operative to be interrogated by radio radiation in a range of frequencies from around 50 MHz to 3 GHz. Thus, the first and second structures can compose radio antennae for receiving the interrogating radiation and emitting the modulated radiation. This provides the advantage that the tag is capable of being physically compact when designed to respond to radiation at this frequency range.

In a first embodiment of the invention, the first structure can incorporate a circular electrode region and the second structure can include a loop antenna. Conveniently, the first structure is spatially within the second structure. This provides the advantage of being a potentially compact arrangement for receiving the interrogating radiation and emitting the modulated radiation.

In a second embodiment of the invention, the first structure can comprise a plurality of electrically interconnected and radially disposed elongate conducting segment tracks, each track operative to function as an acoustic resonator having an associated modal vibrational response and to modulate the first component with the modal response corresponding to a segment track stimulated into resonance by the acoustic vibrations, thereby providing the tag with a signature code modulated onto the modulated radiation. This provides the advantage that the modulated radiation is capable of being modulated by a complex signature by which the tag can be more reliably identified.

In a third embodiment of the invention, the first structure can comprise a launcher electrode connected to the second structure, an interdigitated surface acoustic wave structure and a dipole antenna connected to the interdigitated structure, the launcher electrode operative to couple the second signal to generate surface acoustic waves, the interdigitated structure operative to receive the waves which modulate its electrical characteristics, and the dipole antenna is operative to receive the first component and to generate the first signal which the interdigitated structure is arranged to modulate to provide the modulated radiation. This provides the advantage that the interdigitated structure is capable of modulating the modulated radiation with a signature code, the signature code determined by the manner in which surface acoustic waves propagate through the interdigitated structure.

Embodiments of the invention will now be described, by way of example only, with reference to the following diagrams in which.

Figure 1:
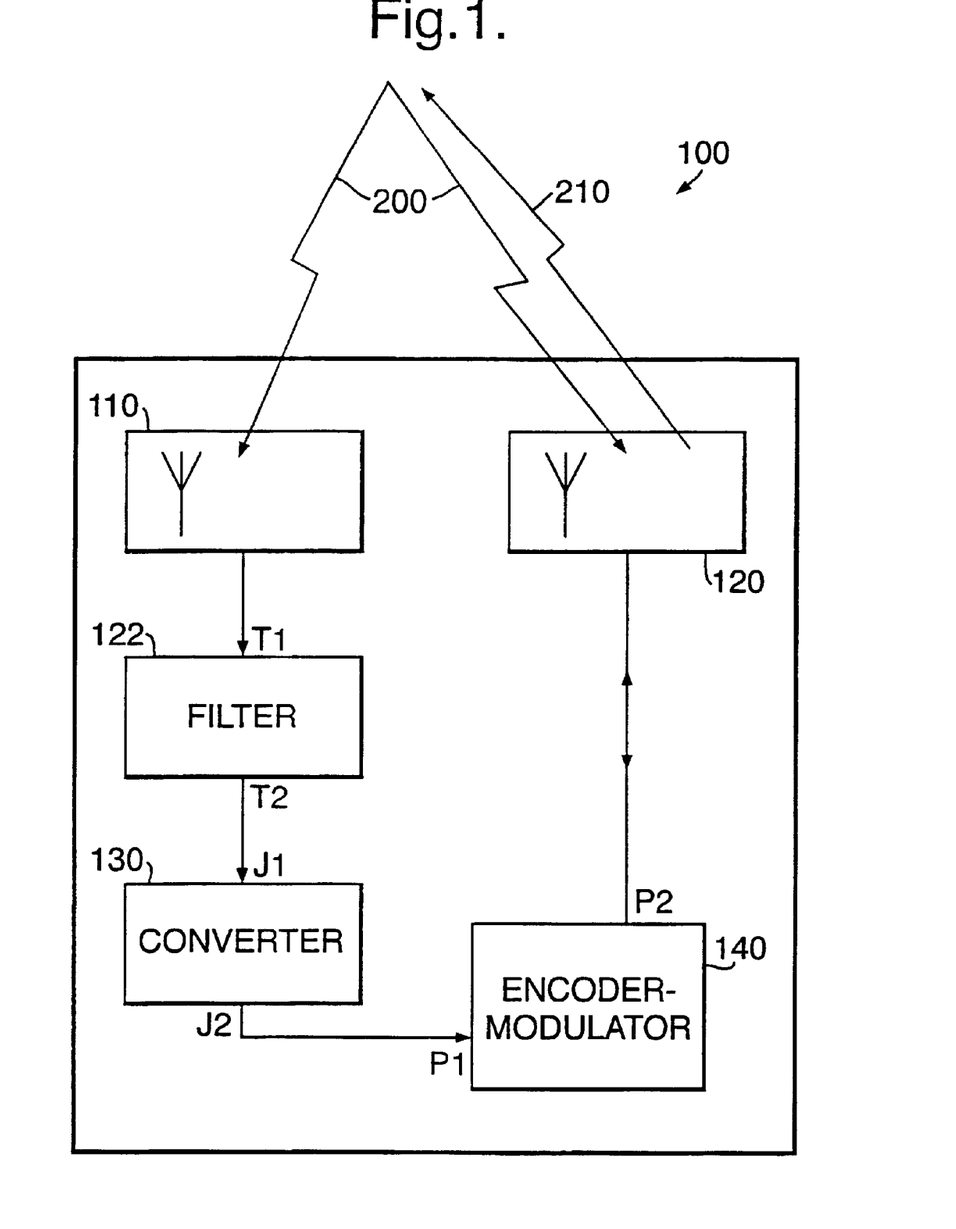
FIG. 1 is a schematic illustration of a generic identification tag according to the invention.

Referring to FIG. 1, there is shown an identification tag indicated by 100. The tag 100 incorporates a support structure which conveniently comprises, for example, a plastic material and is in the form of a small rectangular card having physical dimensions of 85 mm length, 54 mm width and approximately 1 mm thickness. The tag 100 incorporates a first structure 110 for receiving radiation, and a second structure 120 for both receiving and emitting radiation. The tag 100 also comprises a filter structure 122 having an input T1 coupled to the first structure 110 and an output T2 coupled to an input J1 of a converter structure 130. The structure 130 includes an output J2 which is coupled to an input P1 of an encoder-modulator structure 140. The encoder structure 140 incorporates a second port P2 which is connected to the second structure 120.

The structures 110 to 140 are fabricated into or onto the tag 100.

Operation of the tag 100 will now be described with reference to FIG. 1. An interrogating apparatus (not shown) emits interrogating radiation 200 towards the tag 100. The radiation 200 incorporates first and second radiation components having frequencies of $f_1$ and $f_2$ respectively, $f_1$ arranged to be considerably less than $f_2$; for example $f_1=13.56$ MHZ and $f_2=2.45$ GHz. The first and second components are continuous wave radiation. It will be appreciated that the invention is equally applicable if the components are modulated. The first structure 110 receives the radiation 200 and converts it to generate a corresponding signal $S_L$ comprising signal components $S_{L1}$ and $S_{L2}$ corresponding to the first and second radiation components respectively. The signal $S_L$ propagates from the structure 110 to the filter structure 122 whereat the component $S_{L2}$ is removed by filtration and the component $S_{L1}$ propagates to the output T2 wherefrom it propagates to the input J1. The converter structure 130 converts the component $S_{L1}$ into corresponding acoustic radiation by piezo-electric coupling which propagates to the encoder structure 140.

The second structure 120 also receives the interrogating radiation 200 and converts it to a corresponding received signal $S_L$ which also comprises primarily the component $S_{L2}$, and a small residual of the component $S_{L1}$ on account of transducing characteristics exhibited by the second structure 120. The component $S_{L2}$ propagates from the second structure 120 to the encoder structure 140 whereat it is modulated by the component $S_{L1}$ coupled to the encoder structure 140 from the converter structure 130; this generates a modulated signal $S_m$ in the encoder structure 140 which propagates back to the second structure 120 whereat it is emitted as emitted radiation 210 which is subsequently received at the interrogating apparatus (not shown). The apparatus identifies presence of the tag 100 by virtue of modulation applied by the tag 100 to the signal component $S_{L2}$.

As will be described for the embodiments of the invention shown in FIGS. 2, 3 and 4, the encoder structure 140 can provide a specific type of response unique to the tag 100. Moreover, the type of response can be customized for the tag 100 by a number of different methods. On account of the tag 100 converting the signal component $S_{L1}$ from an electrical signal to corresponding acoustic radiation at the converter structure 130, the tag 100 can be regarded to as a "multi-technology tag".

Embodiments of the invention will now be described where the structures 110 to 140 referred to above are implemented in different manners.

Figure 2:
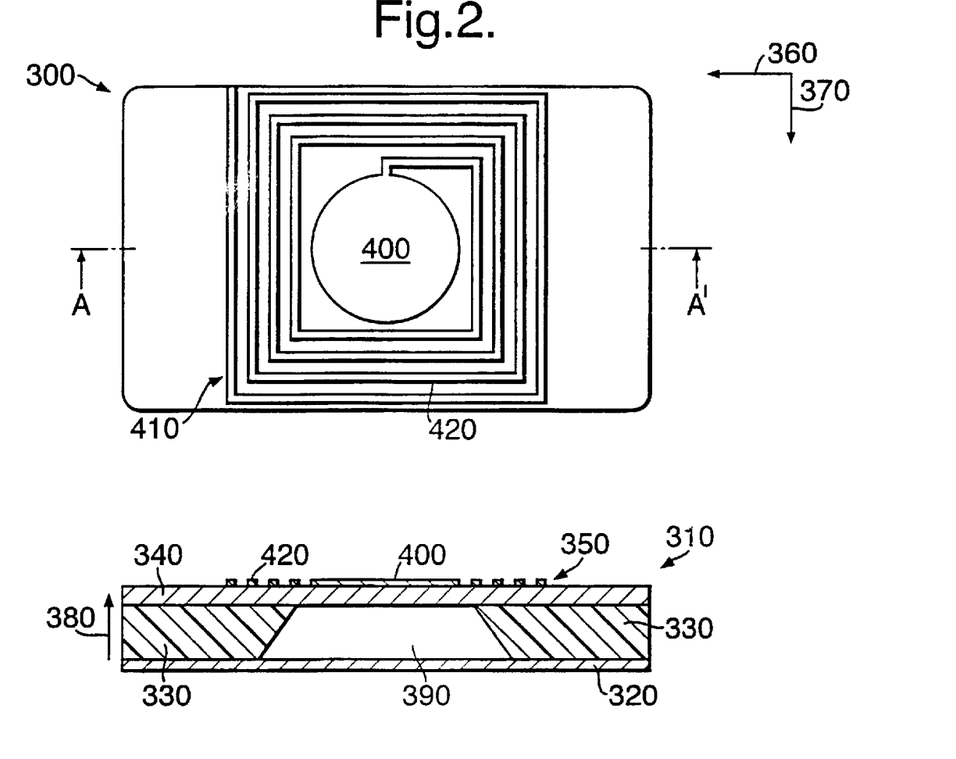
FIG. 2 is an illustration of an identification tag according to a first embodiment of the invention.

Referring now to FIG. 2, there is shown a first embodiment of the invention, namely a tag indicated by 300. There is also shown a cross-sectional view indicated by 310; the view 310 is a cross-section along a line A–A' on the tag 300.

The tag 300 comprises a multilayer assembly incorporating, in sequence, a metal foil backing layer 320, a bulk plastic structural layer 330, a piezoelectric layer 340 and a conductive electrode layer indicated by 350. The tag 300 is in the form of a rectangular card having a length of 85 mm, a width of 54 mm and a thickness of approximately 1 mm in directions of arrows 360, 370, 380 respectively. The arrows 360, 370 are associated with the tag indicated by 300, and the arrow 380 is associated with the view 310. The metal foil layer 320 provides a ground plane and comprises aluminium metal; it is in a range of 50 $\mu$m to 150 $\mu$m thick. The piezoelectric layer 340 is in a range of 100 $\mu$m to 250 $\mu$m thick and comprises a piezoelectric polymer material such as polyvinyl difluoride (PVDF). The structural layer 330 comprises a polymer such as polyvinyl chloride (PVC) and is in a range of 500 $\mu$m to 800 $\mu$m thick. In a central region of the tag 300, the layer 330 includes a void 390, thereby forming a cavity within the tag 300. Top and bottom walls of the cavity are formed by the layers 340, 320 respectively. The void 390 is circular in form, having a diameter in a range of 20 mm to 30 mm, and is arranged to align with a circular electrode structure 400 formed into the electrode layer 350. The circular structure 400 is of a similar diameter to the void 390.

The electrode layer 350 also comprises a spiral antenna structure indicated by 410 formed by a single track 420 having a width of 1 mm and incorporating 3½ concentric turns. A first end of the track 420 terminates at an edge of the tag 300 and a second end thereof terminates by connecting onto the circular structure 400. The electrode layer 350 is in a range of 1 µm to 50 µm thick. The antenna structure 410 has a perimeter in the form of a square perimeter with side lengths of approximately 40 mm.

The structures 400, 410 are formed into the electrode layer 350 by one or more of lithographic processes, selective etching processes and conducting ink silk screen printing processes.

Operation of the tag 300 will now be described with reference to FIG. 2. An interrogating apparatus (not shown) emits interrogating radiation comprising a first radiation component at 13.56 MHZ and a second radiation component at 2.45 GHz. The tag 300 receives the interrogating radiation at the antenna structure 410 and also at the circular electrode structure 400.

The antenna structure 410 functions both as an antenna for receiving the radiation and also as an inductive impedance which forms a tuned circuit in combination with a capacitor formed by the structure 400 and the backing layer 320 across the void 390. The tuned circuit is tuned to substantially 13.56 MHZ thereby coupling the first radiation component received at the structure 410 to the circular structure 400 to generate a fluctuating 13.56 MHZ electric filed across the piezo-electric layer 340 and the void 390. The electric field results in stimulation of acoustic vibrations within the layer 340 on account of its piezoelectric characteristics. The acoustic vibrations modulate physical dimensions of the circular structure 400 which is capable of flexing and stretching on account of the void 390 permitting the layer 340 to be compliant in the vicinity of the void 390.

The circular structure 400 receives the interrogation radiation and, on account of its physical size, is primarily receptive to the second radiation component at 2.45 GHz. The structure 400 reflects the second component although its reflectivity is modulated by the acoustic vibrations changing its dimensions periodically.

Thus, the structure 400 receives the second radiation component and reflects it in modulated form as reflected radiation. The reflected radiation comprises a carrier component at 2.45 GHz together with sideband components principally at (2.45 GHz+13.56 MHZ) and (2.45 GHz −13.56 MHZ). The interrogating apparatus receives the reflected radiation and determines whether or not the tag 300 is within its detection range by whether or not it receives the sideband components with sufficient amplitude to exceed a threshold level preset into the apparatus.

The antenna structure 410 can incorporate fewer than or more than 3½ turns thereby providing each tag 300 with a unique acoustic vibrational signature frequency to which it is most responsive. Alternatively, the thickness of the layer 330 or the area of the structure 400 can be modified to affect tuning thereby providing a unique signature frequency; for example, the area of the structure 400 can be trimmed using laser ablation electrode trimming techniques.

Because the interrogating apparatus is expecting a specific response to its interrogating radiation when interrogating the tag 300, namely generation of the two sideband components, the apparatus will not easily be triggered by spurious ambient radiation or general reflection from passive conducting objects, for example coins or keys; this provides enhanced reliability of specific tag detection. Few, if any, simple metallic parts are capable of generating sideband components specifically in response to receiving interrogating radiation comprising radiation components at 13.45 MHZ and 2.54 GHz. This enhanced reliability is advantageous, for example, where the tag 300 is employed as an electronic access key in security sensitive areas where unauthorised access must be avoided.

Comparing the tag 300 with the tag 100:

(a) the antenna structure 410 is equivalent to the first structure 110;

(b) the circular structure 400 is equivalent to the second structure 120;

(c) a combination of the antenna structure 410 and the capacitor arising between the circular structure 400 and the backing layer 320, thereby forming a 13.45 MHZ tuned filter circuit, is equivalent to the filter structure 122;

(d) the layer 340 in the vicinity of the void 390 where the layer 340 can flex and thereby convert electrical signals to acoustic vibrations is equivalent to the converter structure 130; and (e) the circular structure 400 exhibiting a reflection characteristic which is modifiable by acoustic vibrations within the layer 340 is equivalent to the encoder structure 140.

Figure 3:
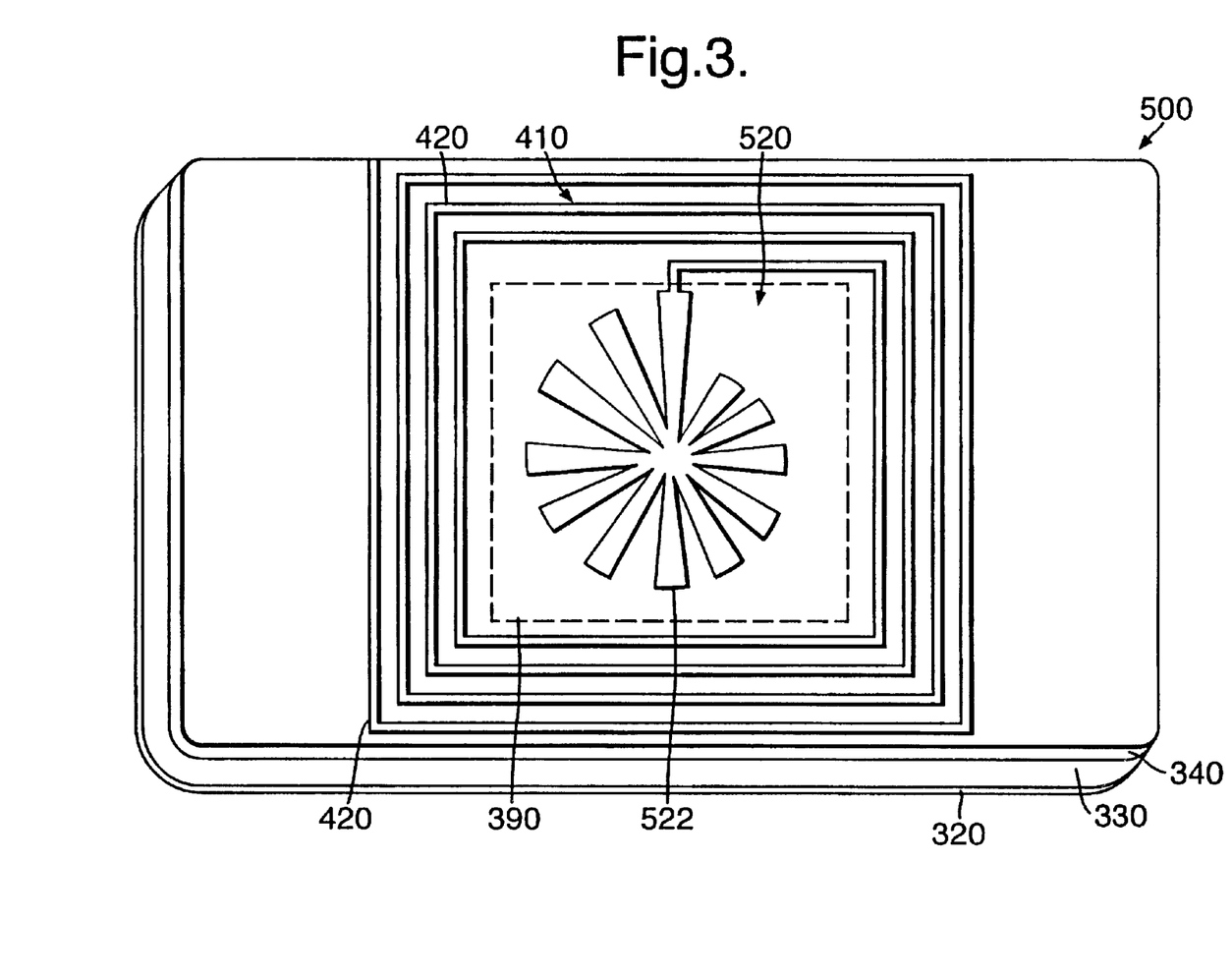
FIG. 3 is an illustration of an identification tag according to a second embodiment of the invention.

Referring now to FIG. 3, there is shown an identification tag according to a second embodiment of the invention; the tag is indicated by 500. The tag 500 is identical to the tag 300 except that the circular structure 400 is replaced by a radial electrode structure indicated by 520. The structure 520 comprises twelve radially disposed electrode segments, for example a segment 522, of mutually different radial lengths but electrically connected at their radial centre as shown. The track 420 is connected at a peripheral region to a longest segment of the structure 520. The segments are arranged in a sequence where they become increasingly longer in a clock-wise sense around the structure 520. Incorporation of the void 390 permits the segments to vibrate more freely. In the tag 500, the void 390 is of rectangular form.

Incorporation of the segments imparts a complex mechanical vibrational modal spectrum to the structure 520, each segment giving rise to an associated series of mechanical resonances. This series corresponds to an encoded signature of the tag 500 by which it can be identified. The vibrational spectrum is modifiable by mass loading the segments, for example by inkjet printing ink dots onto them, or by selectively laser ablating material from specific segments. This permits such tags 500 to be uniquely customisable.

In operation, interrogating radiation directed by an interrogating apparatus (not shown) to the tag 500 includes a lower frequency signal component and a higher frequency signal component, for example a higher frequency component at 2.45 GHz. By sweeping the lower frequency component over a range of frequencies, acoustic resonance modes exhibited by the segments can be sequentially detected in reflected radiation from the structure 520 which is received back at the apparatus. This permits the apparatus to map resonance modes of the tag 500 and thereby determine whether or not the tag 500 has associated with it a particular unique encoded signature.

The tag 500 exploits the structure 520 efficiently in a number of ways, namely the structure 520 functions:

(a) as an antenna for receiving interrogating radiation and reflecting the radiation;

(b) as a tuning capacitor in co-operation with the backing layer 320; and (c) as a piezo-electric resonator providing a complex resonance mode spectrum constituting a signature code for the tag 500.

The tag 500 thereby provides the advantage that it can be interrogated at high speed, for example within 500 μsec. Moreover, if necessary, the interrogating radiation can comprise a high frequency component and several lower frequency components, thereby enabling resonance modes of the structure 520 to be excited simultaneously, thereby permitting more rapid interrogation of the tag 500 to determine its signature. Furthermore, as described above, the tag 500 can be easily customized after manufacture by selective mass loading applied to the structure 520, for example by inkjet printing as described above. This customisation represents a technical development on the tag 300 which exhibits a simpler mechanical resonance mode spectrum for its structure 400.

The tag 500 is characterised in that its signature code arises from its modal resonance frequency response. It is also practicable to provide an identification tag having an associated signature code determined by its time response to interrogating radiation; this will now be described.

Figure 4:
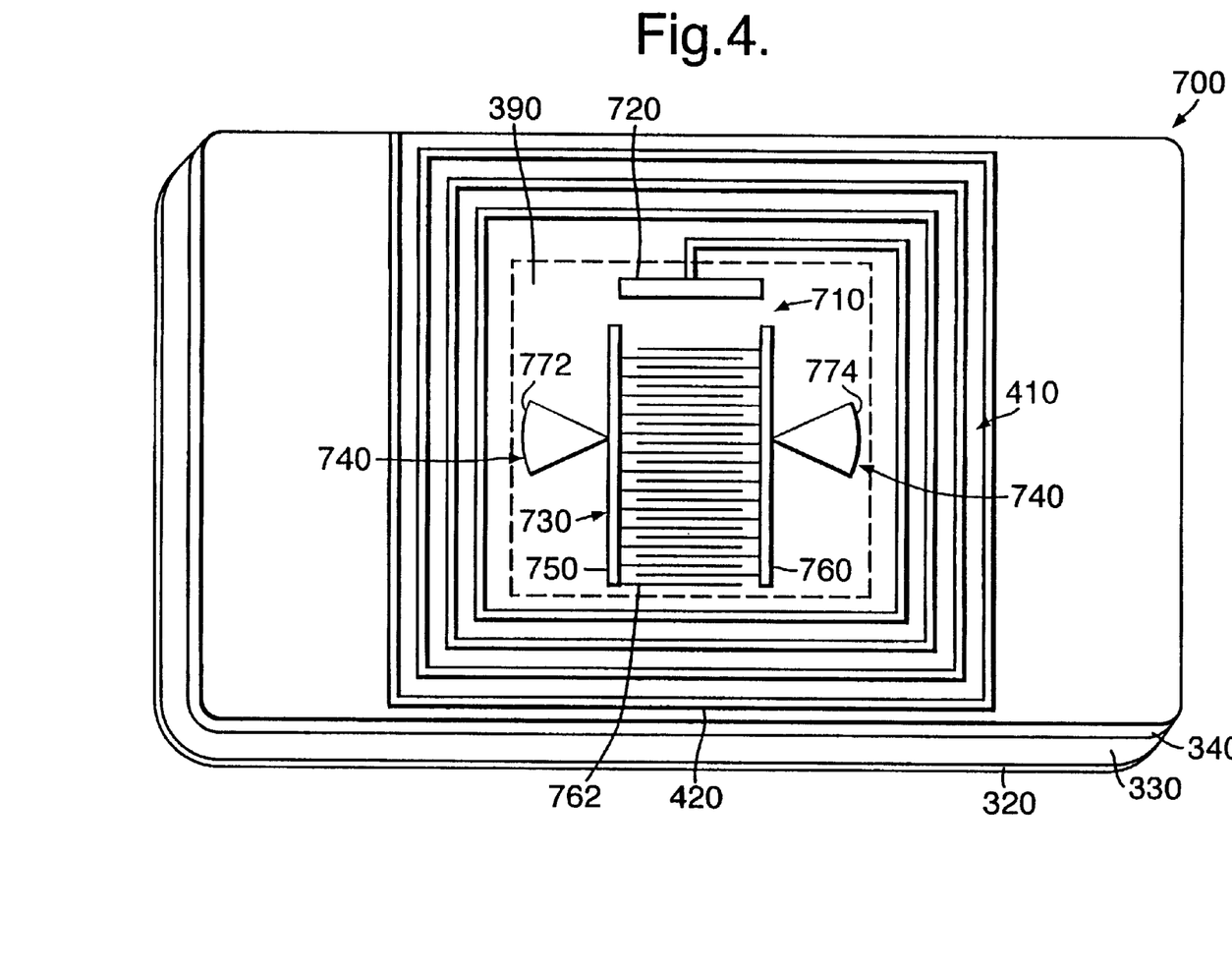
FIG. 4 is an illustration of an identification tag according to a third embodiment of the invention.

Referring to FIG. 4, there is shown an identification tag according to a third embodiment of the invention; the tag is indicated by 700. The tag 700 is identical to the tag 300 except that the circular structure 400 is replaced by a surface acoustic wave (SAW) structure indicated by 710 and the void 390 is of a rectangular form in the tag 700. The SAW structure 710 comprises an acoustic wave launcher electrode 720, an interdigitated electrode structure 730 and a bow-tie dipole antenna 740.

The launcher electrode 720 is of an elongate rectangular form and is electrically connected to the track 420 of the antenna structure 410. The structure 410 is disposed symmetrically about a central point in the tag 700. The launcher electrode 720 is offset from a central point in the tag 700 and its elongate axis is parallel or perpendicular to perimeter edges of the tag 700.

The interdigitated structure 730 comprises two mutually parallel elongate electrodes 750, 760 disposed symmetrically about the central point in the tag 700. Perpendicular to elongate axes of the electrodes 750, 760 are interdigitated tracks, for example a track 762, which intermesh and are connected to their respective electrodes 750, 760. Each electrode 750, 760 is electrically connected to thirteen interdigitated tracks. The electrodes 750, 760 are mutually electrically isolated.

The antenna 740 comprises two substantially triangular electrodes 772, 774, each connected at a corner thereof to a central region of the electrodes 750, 760 respectively. The triangular electrodes 772, 774 are located on opposite sides of the electrodes 750, 760 relative to the interdigitated tracks. Inclusion of the void 390 in the tag 700 ensures that the layer 340 is compliant in the vicinity of the structure 730, thereby assisting surface acoustic wave propagation in the structure 730.

Operation of the tag 700 will now be described with reference to FIG. 4. An interrogating apparatus (not shown) emits interrogating radiation to the tag 700. The interrogating radiation comprises first and second radiation components, the first component comprising bursts of 50 MHZ radiation of 1 μsec duration and at a repetition frequency of 5 kHz, and the second component comprising 2.45 GHz continuous-wave radiation. The interrogating radiation is received at both the antenna structure 410 and at the antenna 740.

The antenna 410 provides an inductive impedance which forms a tuned circuit in combination with a capacitance provided by the launcher electrode 720 in combination with the backing layer 320; the tuned circuit is electrically resonant at 50 MHZ. As a consequence, the antenna 410 is selectively responsive to the first component of the interrogating radiation. Reception of the first component results in a corresponding electrical signal appearing at the electrode 720 which stimulates surface acoustic waves on the layer 340 which propagate in a direction towards the interdigitated structure 730, and also in a direction towards a perimeter edge of the tag 700 whereat they are absorbed.

The acoustic waves are spatially divided into groups of waves on the layer 340 because the first component is temporally divided into bursts, each burst giving rise to a corresponding group of waves.

Each group has a spatial width in its direction of propagation comparable to inter-track spacing in the structure 730. Thus, each group generated propagates to and through the structure 730 and modulates the inter-track spacing, thereby modifying and hence modulating electrical characteristics of the dipole antenna 740. In consequence of the repetition frequency being relatively low, namely 5 kHz, only one group of waves propagates at any instant of time on the layer 340.

The antenna 740 receives the second component of the interrogating radiation and generates a corresponding electrical signal which propagates through the electrodes 750, 760 and their associated tracks and then is re-emitted as reflected radiation from the antenna 740. The antenna 740 is relatively insensitive to the first component of the interrogating radiation on account of its physical dimensions. As a consequence of the tracks of the electrodes 750, 760 being affected by groups of surface acoustic waves propagating therethrough, the reflected radiation is modulated by the bursts present in the first component of the interrogating radiation; this results in the generation of sideband radiation components in the reflected radiation.

The interrogating apparatus (not shown) determines the presence of the tag 700 by detecting the sideband components in the reflected radiation received thereat; the sideband components are affected as the groups of acoustic waves propagate through the structure 730. Reflection of the interrogating radiation from simple metallic objects does not result in reflected radiation including such sideband components. This enables the interrogating apparatus to distinguish presence of the tag 700 from passive reflectors such as simple metallic objects.

The tag 700 can be customized so as to provide it with a signature code to distinguish it uniquely from similar tags. This can be achieved by selectively removing tracks connected to the electrodes 750, 760 using laser cutting techniques, for example by laser ablation, or ion milling techniques. Alternatively, when the tag 700 is manufactured, the tracks can be arranged to be initially disconnected from their respective electrodes 750, 760 by small gaps; these gaps can be selectively bridged by printing conductive ink dots thereonto, thereby selectively connecting tracks and thus providing the tag 700 with its signature code. Moreover, the ink dots can also serve as customising dots which are readable using optical scanning apparatus, for example bar code readers.

The signature code is read out sequentially when a group of waves propagates through the structure 730. Thus, a spatial distribution of conductive ink dots on the structure 730 or a spatial distribution of laser cuts on tracks is output in the sidebands of reflected radiation from the tag 700 when a group of waves propagates through the structure 730, thereby providing the tag 700 with its signature code.

The tags 300, 500, 700 are usable in a number of applications, for example:

(a) for use as personnel-wearable personal identification tags;

(b) for use as anti-theft tags as affixed to valuable merchandise in shops or valuable books and manuscripts in libraries;

(c) for use as validatable entrance tickets, for example as an alternative to conventional tickets incorporating holographic images for verification purposes;

It will be appreciated by those skilled in the art that variations can be made to the tags 100, 300, 500, 700 without departing from the scope of the invention. Thus, the tags 100, 300, 500, 700 can have physical dimensions different to those described with reference to FIGS. 1 to 4. Moreover, the tags 100, 300, 500, 700 can be incorporated as a integral part of products, for example books. Furthermore, alternative materials can be used for the layers 320, 330, 340, 350 provided that they function in a related manner to the materials used for layers 320, 330, 340, 350. Likewise, alternative structures can be substituted for the structures 400, 520, 730 provided that they are capable of modulating radiation received thereat by a signal generated in the antenna 410. For example, the antenna structure 410 and the circular structure 400 may be substituted with thin film structures receptive to modulated optical radiation but also capable of emitting radio wave radiation in response; this provides the advantage that the tag could be interrogated with one type of radiation and respond with another type of radiation, thereby counteracting cross-talk problems in associated interrogating apparatus. Alternatively, the antenna structure 410 can be replaced with a dipole antenna.

Moreover, the tags 100, 300, 500, 700 can be modified to incorporate a power source, for example a solar cell or miniature power cell, together with an amplifier for providing amplification, thereby enabling the tags to operate at greater distances from an associated interrogating source. The amplifier, conveniently, incorporates a signal storage element and operates in pseudo-continuous mode to counteract occurrence of spontaneous self oscillation within the tag.

The tag 700 is also capable of being adapted to operate as a non-contact interrogatable strain sensor. The tag 700 can be made thinner, for example 300 $\mu$m thick, and affixed to objects which are subjected to stress and require monitoring. When the objects are metallic, for example a metal drive shaft of a road vehicle or a metal turbine blade, the backing layer 320 is not required because the objects themselves provide an earth plane for the adapted tag 700. Since each adapted tag provides a signature code corresponding thereto, a single interrogating apparatus can be used to collect strain data from a plurality of the adapted tags functioning as strain sensors affixed to various parts of objects. For example, an adapted version of the tag 700 can be affixed to each blade of a rotor, thereby permitting an interrogating apparatus to monitor strain individually on each blade. This characteristic of the tag 700 arises from strain modulating interdigitated electrode spacings thereof, thereby modifying its signature code in a manner indicative of strain.

What is claimed is:

1. An identification tag, comprising:
a) transponding means for receiving interrogating radiation and for emitting modulated radiation in response; and
b) modulating means for modulating the received interrogating radiation in a manner indicative of tag identity to generate the modulated radiation, the transponding means including first and second structures for receiving first and second radiation components of the interrogating radiation and generating corresponding first and second signals respectively, said first and second components being at mutually different frequencies, the modulating means including a coupling structure operative for receiving the second signal and generating corresponding acoustic radiation, and for coupling the acoustic radiation to the first structure, the acoustic radiation modulating the first signal in the first structure to generate the modulated radiation, the coupling structure comprising a piezo-electric film for generating the acoustic radiation in response to the second signal, the first and second structures comprising radio antennas for receiving the interrogating radiation and emitting the modulated radiation, and the antennas comprising conductive regions formed onto the piezo-electric film on a surface of the tag, the film being operative to generate the acoustic radiation in response to the second signal.

2. The tag according to claim 1, wherein the film is of piezo-electric polyvinyl difluoride (PVDF) material.

3. The tag according to claim 1, wherein the film is in a range of 100 $\mu$m to 250 $\mu$m thick.

4. The tag according to claim 1, wherein the first structure includes one of a dipole antenna and a circular electrode region, and wherein the second structure includes a loop antenna.

5. The tag according to claim 1, wherein the first structure is spatially within the second structure.

6. The tag according to claim 1, wherein the first structure comprises a plurality of electrically interconnected and radially disposed elongate conducting segment tracks, each track being operative to function as an acoustic resonator having an associated modal vibrational response and to modulate the first component with a modal response corresponding to a segment track stimulated into resonance by acoustic vibrations, thereby providing the tag with a signature code modulated onto the modulated radiation.

7. The tag according to claim 6, wherein the signature code is customizable by selectively mass loading or selectively trimming the segment tracks.

8. The tag according to claim 7, wherein the segment tracks are selectively mass loadable by printing ink thereonto.

9. The tag according to claim 7, wherein the segment tracks are selectively trimmable by laser cutting techniques.

10. The tag according to claim 7, wherein modifications to the tracks to customize the tag are optically readable by an optical scanning device.

11. The tag according to claim 1, wherein the first structure comprises a launcher electrode connected to the second structure, an interdigitated surface acoustic wave structure and a dipole antenna connected to the interdigitated structure, the launcher electrode being operative to couple the second signal to generate surface acoustic waves, the interdigitated structure operative to receive the waves which modulate its electrical characteristics, and the dipole antenna being operative to receive the first component and to generate the first signal which the interdigitated structure is arranged to modulate to provide the modulated radiation.

12. The tag according to claim 11, wherein the interdigitated structure incorporates interdigitated tracks which are selectively connectable to provide the modulated radiation with a signature code for the tag.

13. The tag according to claim 12, wherein the tracks are connectable by printing conductive ink thereonto or disconnectable by laser cutting techniques.

14. The tag according to claim 1, wherein the modulating means and transponding means are operative to co-operate to form a filter for selectively isolating the second signal from the interrogating radiation for use in generating the modulated radiation.

15. The tag according to claim 1, further comprising a plurality of layers, the layers comprising in sequence a backing layer, a structural layer, a piezo-electric layer, and an electrode layer, the transponding means and the modulating means formed substantially into the piezo-electric layer and the electrode layer.

16. The tag according to claim 15, wherein the structural layer incorporates a void region aligned to a region of the piezo-electric layer in which acoustic waves substantially propagate.

17. The tag according to claim 16, wherein the backing layer is conductive.

18. The tag according to claim 1, wherein the second structure provides an inductive impedance which forms a tuned circuit in combination with a capacitor formed by the first structure and a backing layer of the tag.

19. A personnel wearable identity card incorporating an identification tag, comprising:
   a) transponding means for receiving interrogating radiation and for emitting modulated radiation in response; and
   b) modulating means for modulating the received interrogating radiation in a manner indicative of tag identity to generate the modulated radiation, the transponding means including first and second structures for receiving first and second radiation components of the interrogating radiation and generating corresponding first and second signals respectively, said first and second components being at mutually different frequencies, the modulating means including a coupling structure operative for receiving the second signal and generating corresponding acoustic radiation, and for coupling the acoustic radiation to the first structure, the acoustic radiation modulating the first signal in the first structure to generate the modulated radiation, the coupling structure comprising a piezo-electric film for generating the acoustic radiation in response to the second signal, the first and second structures comprising radio antennas for receiving the interrogating radiation and emitting the modulated radiation, and the antennas comprising conductive regions formed onto the piezo-electric film on a surface of the tag, the film being operative to generate the acoustic radiation in response to the second signal.

20. An anti-theft tag for counteracting theft of items attached thereto, the anti-theft tag incorporating an identification tag, comprising:
   a) transponding means for receiving interrogating radiation and for emitting modulated radiation in response; and
   b) modulating means for modulating the received interrogating radiation in a manner indicative of tag identity to generate the modulated radiation, the transponding means including first and second structures for receiving first and second radiation components of the interrogating radiation and generating corresponding first and second signals respectively, said first and second components being at mutually different frequencies, the modulating means including a coupling structure operative for receiving the second signal and generating corresponding acoustic radiation, and for coupling the acoustic radiation to the first structure, the acoustic radiation modulating the first signal in the first structure to generate the modulated radiation, the coupling structure comprising a piezo-electric film for generating the acoustic radiation in response to the second signal, the first and second structures comprising radio antennas for receiving the interrogating radiation and emitting the modulated radiation, and the antennas comprising conductive regions formed onto the piezo-electric film on a surface of the tag, the film being operative to generate the acoustic radiation in response to the second signal.

21. A combination comprising:
   a) an identification tag including
      i) transponding means for receiving interrogating radiation and for emitting modulated radiation in response; and
      ii) modulating means for modulating the received interrogating radiation in a manner indicative of tag identity to generate the modulated radiation, the transponding means including first and second structures for receiving first and second radiation components of the interrogating radiation and generating corresponding first and second signals respectively, said first and second components being at mutually different frequencies, the modulating means including a coupling structure operative for receiving the second signal and generating corresponding acoustic radiation, and for coupling the acoustic radiation to the first structure, the acoustic radiation modulating the first signal in the first structure to generate the modulated radiation, the coupling structure comprising a piezo-electric film for generating the acoustic radiation in response to the second signal, the first and second structures comprising radio antennas for receiving the interrogating radiation and emitting the modulated radiation, and the antennas comprising conductive regions formed onto the piezo-electric film on a surface of the tag, the film being operative to generate the acoustic radiation in response to the second signal; and
   b) an apparatus for interrogating the tag, the apparatus operative to emit the interrogating radiation to the tag, said interrogating radiation comprising first and second radiation components, and operative to receive modulated radiation emitted from the tag in response to the interrogating radiation and to determine identity of the tag from radiation components present in the modulated radiation corresponding to the first radiation component modulated by the second radiation component.

22. A strain sensor incorporating an identification tag, comprising:
   a) transponding means for receiving interrogating radiation and for emitting modulated radiation in response; and
   b) modulating means for modulating the received interrogating radiation in a manner indicative of tag identity to generate the modulated radiation, the transponding means including first and second structures for receiving first and second radiation components of the interrogating radiation and generating corresponding first and second signals respectively, said first and second components being at mutually different frequencies, the modulating means including a coupling structure operative for receiving the second signal and generating corresponding acoustic radiation, and for coupling the acoustic radiation to the first structure, the acoustic radiation modulating the first signal in the first structure to generate the modulated radiation, the coupling structure comprising a piezo-electric film for generating the acoustic radiation in response to the second signal, the first and second structures comprising radio antennas for receiving the interrogating radiation and emitting the modulated radiation, and the antennas comprising conductive regions formed onto the piezo-electric film on a surface of the tag, the film being operative to generate the acoustic radiation in response to the second signal, wherein the first structure comprises a launcher electrode connected to the second structure, an interdigitated surface acoustic wave structure and a dipole antenna connected to the interdigitated structure, the launcher electrode being operative to couple the second signal to generate surface acoustic waves, the interdigitated structure operative to receive the waves which modulate its electrical characteristics, and the dipole antenna being operative to receive the first component and to generate the first signal which the interdigitated structure is arranged to modulate to provide the modulated radiation, and wherein the sensor is operative to sense strain coupled to the tag causing change in the interdigitated structure and inducing corresponding changes induced in the modulated radiation.

* * * * *